United States Patent [19]

Hirabayashi et al.

[11] 4,208,390

[45] Jun. 17, 1980

[54] PROCESS FOR THE RECOVERY OF AMMONIA AND SULPHUR DIOXIDE FROM A CONTAMINATED AMMONIUM SALT OF SULPHURIC ACID

[75] Inventors: Teruhiko Hirabayashi, Tokyo, Japan; Willem J. Wassen, Geleen, Netherlands

[73] Assignees: Nittetu Chemical Engineering Ltd. (Nice), Tokyo, Japan; Stamicarbon, B.V., Geleen, Netherlands

[21] Appl. No.: 899,396

[22] Filed: Apr. 24, 1978

[30] Foreign Application Priority Data

Apr. 25, 1977 [NL] Netherlands .......................... 7704481

[51] Int. Cl.$^2$ .......................... C01C 1/02; C01B 17/50
[52] U.S. Cl. .................................. 423/356; 423/541 A
[58] Field of Search .............. 423/540, 542, 356, 539, 423/541, 541 A

[56] References Cited

U.S. PATENT DOCUMENTS

| | | | |
|---|---|---|---|
| 3,254,951 | 6/1966 | Kautter et al. .................... | 423/540 X |
| 3,942,237 | 3/1976 | Fukert ................................. | 423/542 |
| 3,991,047 | 11/1976 | Moudry et al. .................. | 423/542 X |

Primary Examiner—O. R. Vertiz
Assistant Examiner—Gregory A. Heller
Attorney, Agent, or Firm—Cushman, Darby & Cushman

[57] ABSTRACT

An improved process for the recovery of ammonia and sulphur dioxide from a by-product mixture containing an ammonium salt of sulphuric acid obtained as a by-product in the preparation of ε-caprolactam or cyclohexanone oxime. The by-product mixture is reacted, in finely divided form and at a temperature of from 700° to 950° C., with gases obtained from the combustion of a fuel in a controlled amount of oxygen, and ammonia and sulphur dioxide are thereafter separated from the resulting reaction mixture. The amount of oxygen is controlled to be less than the theoretical additional amount that would be required to convert the nitrogen, sulphur, hydrogen and carbon contained in the by-product mixture and fuel into, respectively, $N_2$, $SO_2$, $H_2O$ and $CO_2$.

8 Claims, No Drawings

PROCESS FOR THE RECOVERY OF AMMONIA AND SULPHUR DIOXIDE FROM A CONTAMINATED AMMONIUM SALT OF SULPHURIC ACID

The invention relates to a process for the recovery of ammonia and sulphur dioxide from a contaminated ammonium salt of sulphuric acid by making it react in a finely divided state with combustion gases at an elevated temperature and recovering ammonia and sulphur dioxide from the resulting reaction mixture.

In the preparation of ε-caprolactam, such as by the Beckmann rearrangement of cyclohexanone oxime by means of sulphuric acid, oleum or sulphur trioxide, or by reaction of cyclohexane carboxylic acid with a nitrosating agent in the presence of sulphuric acid, a relatively large amount of contaminated ammonium salt of sulphuric acid is obtained as a by-product. An equivalent amount of contaminated ammonium salt of sulphuric acid is also obtained by the so-called Raschig synthesis in the preparation of the cyclohexanone oxime to be rearranged into caprolactam.

Processing such a contaminated ammonium salt, which usually contains up to about 4% by weight (calculated on a dry basis) of organic impurities, into a useful product such as ammonium sulphate fertilizer, is not very attractive economically. A more attractive alternative is to recover ammonia and sulphur dioxide from the salt in question.

In principle, this can be accomplished by the method described in British Patent Specification No. 1,014,945, which recovers ammonia and sulphur dioxide from waste sulphuric acid containing ammonium sulphate or ammonium hydrogen sulphate, specifically obtained as a by-product in the preparation of acrylic or methacrylic acid. In the process of this British Patent, the waste acid is brought into contact with the combustion products of a fuel gas or oil at a temperature of from 400° to 600° C. in a reducing atmosphere and preferably in the presence of a solid material such as coke or fire brick. However, when this known method is applied to a contaminated ammonium salt obtained as a by-product in the production of ε-caprolactam or a cyclohexanone oxime, the resulting reaction mixture contains too large an amount of nitrous gases and sulphur trioxide, whereas the organic impurities do not burn completely.

A process has now surprisingly been found whereby the recovery of ammonia and sulphur dioxide from a by-product mixture containing an ammonium salt of sulphuric acid, obtained as a by-product in the preparation of ε-caprolactam or cyclohexanone oxime, can be significantly improved over the recovery possible under the process of the prior art, while at the same time more completely burning the organic impurities.

This improved recovery, according to the process of the invention, is achieved by reacting the by-product mixture, in a finely divided state and at a temperature of 700° to 950° C., with gases obtained by the combustion of a fuel with a controlled amount of oxygen. Specifically, the combustion of the fuel is carried out in an amount of oxygen less than the theoretical amount of oxygen that would be required to completely burn the fuel and by-product mixture, and preferably 85%–99.5% of this theoretical amount. Most preferably, this controlled amount of oxygen should be in the range of from 90 to 98% of such theoretical amount.

This theoretical amount of oxygen is determined by calculating the additional amount of oxygen that would be required to convert all of the nitrogen, sulphur, hydrogen and carbon contained in the fuel and the by-product mixture (including organic impurities) into, respectively, $N_2$, $SO_2$, $H_2O$ and $CO_2$.

The ammonium salt of sulphuric acid contained in the by-product mixture obtained in the preparation of ε-caprolactam may be ammonium sulphate, ammonium hydrogen sulphate or a mixture thereof, or it may be ammonium hydrogen sulphate mixed with some sulphuric acid. Equivalent by-product mixtures containing an ammonium salt of sulphuric are also obtained in the preparation of cyclohexanone oxime and may also be used in the process according to the invention. The process according to the invention is particularly suitable for a by-product mixture containing an ammonium salt of sulphuric acid that consists substantially of ammonium hydrogen sulphate, which includes mixtures of $NH_4HSO_4$ and $(NH_4)_2SO_4$ having a weight ratio $NH_4HSO_4:(NH_4)_2SO_4$ greater than 70:30 and mixtures of $NH_4HSO_4$ and $H_2SO_4$ having a weight ratio of $NH_4HSO_4:H_2SO_4$ greater than 75:25, and containing from 0.5 to 2.5% by weight organic impurities (calculated on a dry basis to the total amount of by-product mixture).

The combustion gases needed in the process according to the invention can be obtained by combustion of fossil fuels such as, for example, petroleum or natural gas, or of products obtained from fossil fuels such as, for example, gases obtained in cracking petroleum. Equivalent combustion gases obtained from the combustion of other fuels, such as methanol, may also be used.

The reaction of the ammonium salt with the combustion gases may be carried out at various temperatures of between 700° and 950° C. Preferably, best results can be obtained at a temperature of between about 800°–870° C.

The process according to the invention may be realized in practice in various ways. By preference, the ammonium salt is mixed with the combustion gases in the form of small drops of an aqueous solution or melt (diameter of drops smaller than 200μ, for instance) and then passed through a reaction zone, for example, a cylindrical furnace. The average residence time of the reaction mixture in the reaction zone is usually about 0.2 to 10 seconds.

The process according to the invention will be further elucidated at the following examples. Although the by-product mixture used in the examples for purposes of illustration was obtained in the preparation of ε-caprolactam by the Beckmann rearrangement of cyclohexanone oxime, it should be understood that the process of the invention is equally applicable to by-product mixtures obtained in the preparation of ε-caprolactam by other processes and/or processes for the preparation of cyclohexanone oxime identified above.

EXAMPLE I

An aqueous solution of ammonium hydrogen sulphate (50% by weight of $NH_4HSO_4$, 49.1% by weight of water and 0.9% by weight of organic impurities) was obtained as a by-product in the preparation of ε-caprolactam by the Beckmann rearrangement of cyclohexanone oxime. This by-product mixture, having a temperature of about 25° C., was atomized in an atomizer by means of steam, (5 atm. gauge) and then mixed in a mixing cyclone with combustion gases having a temperature of about 1400° C. The combustion gases were obtained by combustion of a hydrocarbon mixture (95% by volume propane, 2.5% by volume isobutane, 2% by volume n-butane, and 0.5% by volume ethane) with air in a vortex burner (axial feed of hydrocarbon mixture, tangential feed of air).

The mixture thus obtained from the mixing cyclone was passed into the top of a vertically arranged cylindrical furnace (internal diameter 0.4 meter, length 1.2 meters). The reaction temperature in the furnace was kept at about 810° C. by control of the ratio between the amount of combustion gas and the amount of aqueous solution of ammonium hydrogen sulphate.

The gaseous mixture formed in the furnace containing ammonia and sulphur dioxide was discharged from the furnace and then passed through a vessel with water in which the gaseous mixture was cooled and washed. The temperature of the cooling/washing water was 80° C., while the temperature of the cooled gaseous mixture discharged from the vessel was only 1°-2° C. higher. The cooled gaseous mixture was then passed through a cyclone, in which the drops of liquid were removed, and then into a water-washing installation wherein the ammonia and sulphur dioxide were absorbed from the gaseous mixture. The gaseous mixture that remained after absorption was vented to the atmosphere.

The aqueous solution containing ammonium hydrogen sulphate was fed to the mixing cyclone at a rate of 25 kg per hour. The ratio between the amount of oxygen in the air used for the combustion of the fuel and the theoretical amount of oxygen required for the complete conversion of the fuel and the by-product mixture (as defined above) was 0.96:1. The average residence time of the reaction mixture in the furnace was 0.75 second.

After the test installation had been heated to the required temperature, which took about 24 hours, various samples were taken over a period of 4 hours, after which the experiment was terminated. Analysis of these samples show that the amount of ammonia contained in the gaseous mixture discharged from the furnace corresponded to 82% of the chemically bonded ammonia contained in the aqueous solution, and the amount of sulphur dioxide corresponded to 95% of the total amount of sulphur in such aqueous solution. 97% of the organic impurities in the aqueous solution had decomposed. 5% of the amount of sulphur in the ammonium hydrogen sulphate had been converted into $SO_3$. The gas discharged from the furnace contained 20 parts by weight per million of nitrous gases (NO and $NO_2$), while the oxygen content of this gas ranged between 0.01 and 0.02% by volume.

COMPARATIVE EXAMPLE

An experiment is described in Example 1 was carried out with the ratio between the amount of oxygen in the combustion air and the theoretical amount of oxygen required for complete conversion of the fuel and by-product mixture (as defined above) being increased to 1:04:1. The furnace temperature was about 850° C. Now the reaction mixture leaving the furnace contained only 32% of the ammonia which theoretically could have been formed from the aqueous solution and only 78% of the sulphur dioxide which theoretically could have been formed. 12% of the sulphur initially present in the aqueous solution had been converted into $SO_3$. The gas discharged from the furnace contained 30-50 parts by weight per million of nitrous gases, while the oxygen content of this gas ranged between 0.44 and 0.55% by volume.

EXAMPLE II

An example as described in Example I was carried out at a furnace temperature of 850° C., while the ratio between the amount of oxygen in the combustion air and the theoretical amount of oxygen required for complete conversion was 0.96:1. 23 kg of the aqueous solution of ammonium hydrogen sulphate were fed in per hour.

The reaction mixture leaving the furnace contained 73% of the ammonia which theoretically could have been formed from the aqueous solution and 95.4% of the sulphur dioxide which theoretically could have been formed. 4.6% of the amount of sulphur initially present in the aqueous solution had been converted into $SO_3$. 97% of the organic impurities appeared to have been decomposed. The gas discharged contained 10-12 parts by weight per million of nitrous gases, while the oxygen content of this gas was 0.005-0.010% by volume.

What is claimed is:

1. In a process for the recovery of ammonia and sulphur dioxide from a by-product mixture containing ammonium salt of sulphuric acid and organic impurities by reacting said by-product mixture in a finely divided state at an elevated temperature with gases obtained from the combustion of a fuel with oxygen and separating ammonia and sulphur dioxide from the resulting reaction mixture, the improvement wherein
   said by product mixture is obtained as a by-product in the preparation of $\epsilon$-caprolactam or cyclohexanone oxime, and
   said by-product mixture is reacted at a temperature of from 700° to 950° C. with gases obtained from the combustion of said fuel with an amount of oxygen 85% to 99.5% of the theoretical additional amount of oxygen that would be required to convert the nitrogen, sulphur, hydrogen and carbon in said fuel and by-product mixture into $N_2$, $SO_2$, $H_2O$ and $CO_2$, respectively.

2. The process of claim 1 wherein said by-product mixture is in the form of an aqueous solution and the ammonium salt of sulphuric acid consists substantially of ammonium hydrogen sulphate.

3. The process of claim 2 wherein organic impurities are present in said by-product mixture in an amount of from 0.5 to 2.5% by weight exclusive of water.

4. The process of claim 1 wherein said gases are obtained from the combustion of said fuel with an amount of oxygen 90 to 98% of said theoretical amount.

5. The process of claim 1 wherein said by-product mixture is reacted at a temperature of from 800° to 870° C.

6. The process of claim 1 wherein said by-product mixture is a by-product of the preparation of $\epsilon$-caprolactam by the Beckmann rearrangement of cyclohexanone oxime by means of sulphuric acid, oleum or sulphur trioxide.

7. The process of claim 1 wherein said by-product mixture is a by-product of the preparation of $\epsilon$-caprolactam by reaction of cyclohexane carboxylic acid with a nitrosating agent in the presence of sulphuric acid.

8. The process of claim 1 wherein said by-product mixture is a by-product of the preparation of cyclohexanone oxime by the Raschig synthesis.

* * * * *